Sept. 7, 1954 J. E. JENDRISAK 2,688,210
GLASS BENDING APPARATUS
Filed March 10, 1953 2 Sheets-Sheet 1
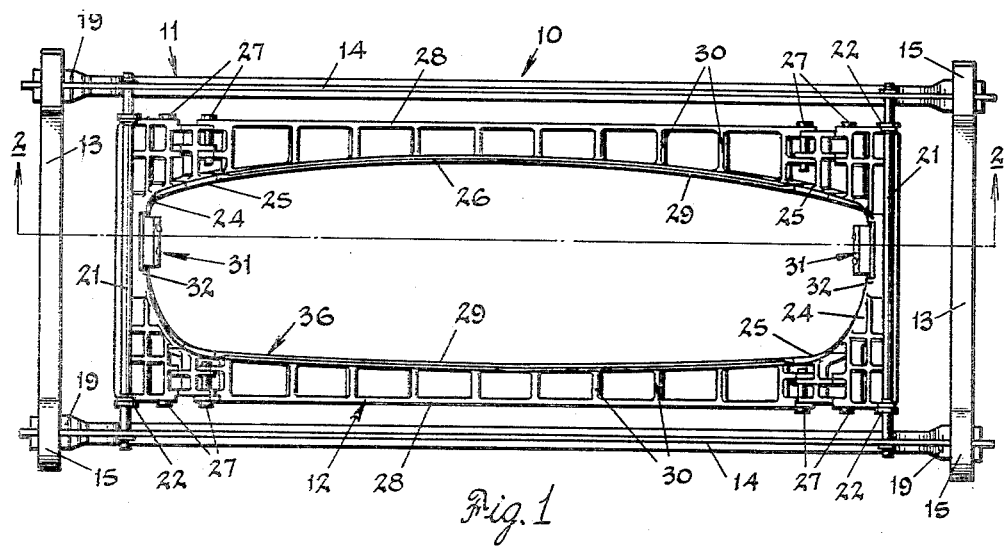
Fig. 1
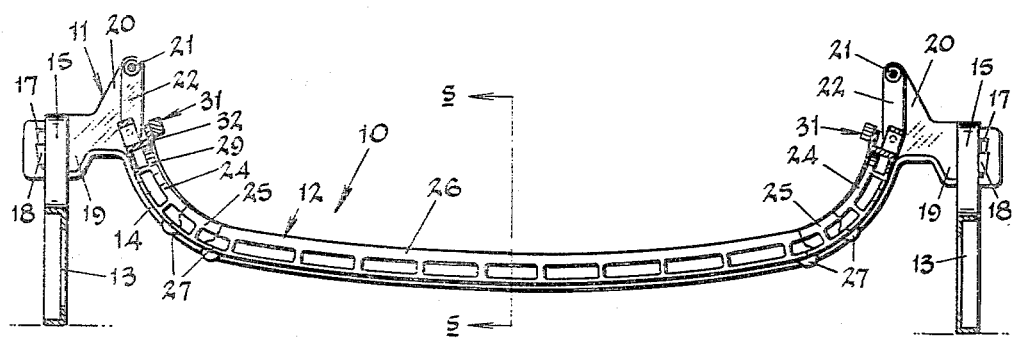
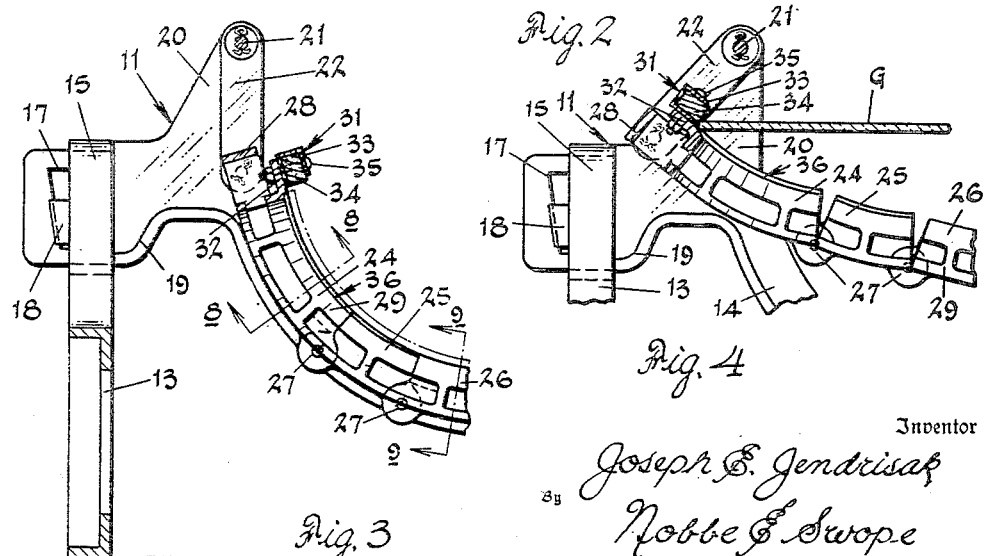
Fig. 2
Fig. 3
Fig. 4
Inventor
Joseph E. Jendrisak
By Nobbe & Swope
Attorneys

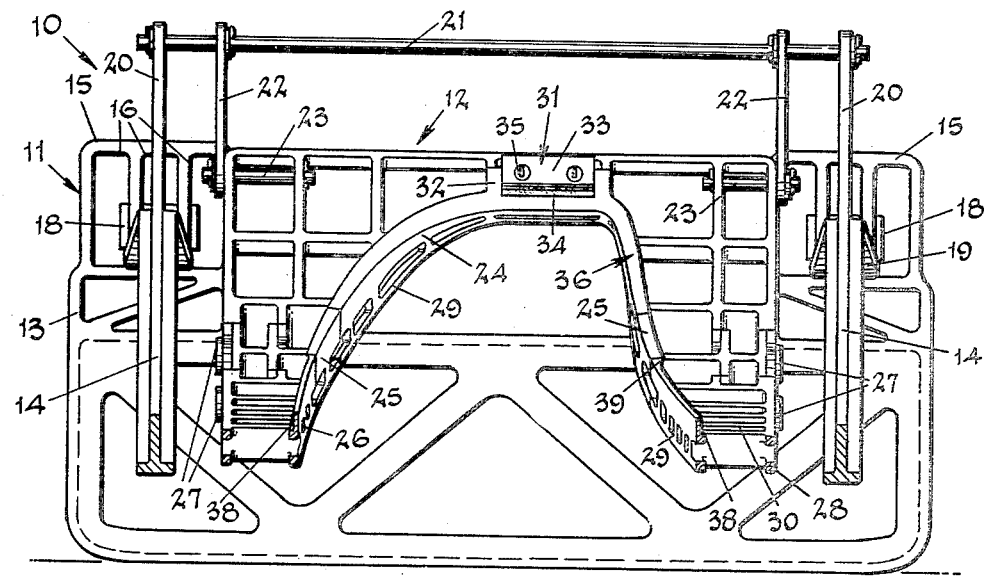
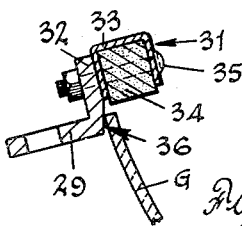 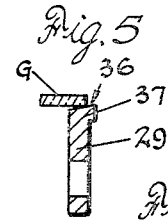 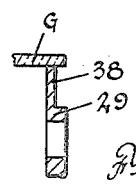
Fig. 7　　Fig. 8　　Fig. 9
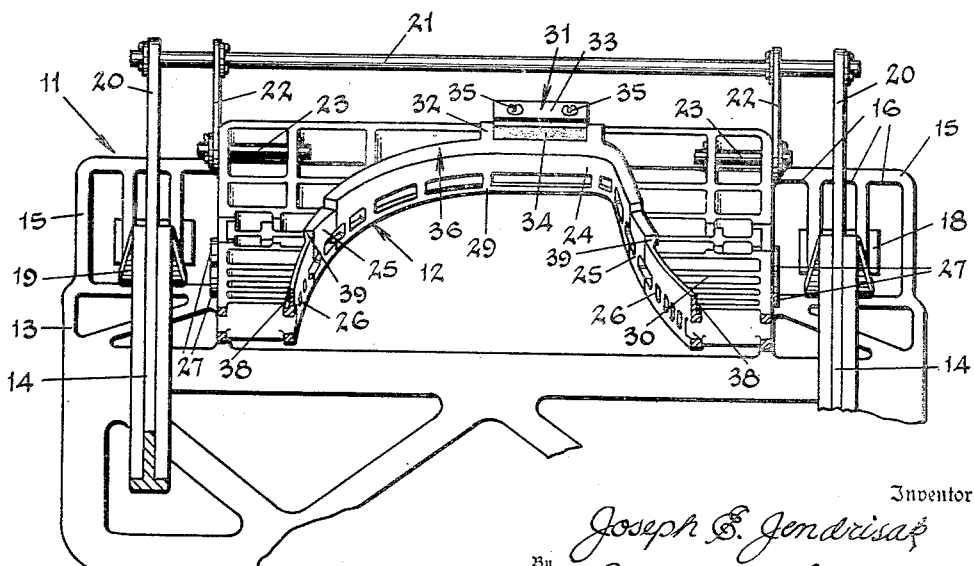
Fig. 6

Patented Sept. 7, 1954

2,688,210

UNITED STATES PATENT OFFICE 2,688,210

GLASS BENDING APPARATUS

Joseph E. Jendrisak, Northville, Mich., assignor to Libbey-Owens-Ford Glass Company, Toledo, Ohio, a corporation of Ohio Application March 10, 1953, Serial No. 341,539

13 Claims. (Cl. 49—67)

This invention relates broadly to apparatus for bending sheets or plates of glass. In particular, it relates to an improved bending mold having a shaping surface of the type which conforms to the curvature and in outline to a bent glass sheet. To be even more specific, this invention relates to an improved mold shaping surface of the type described which is formed in such a manner as to minimize contact therewith by a glass sheet being bent into conformity with the curvature thereof under the influence of heat.

In the bending of glass sheets or plates into conformity with a mold shaping surface, mold marks have been found to occur on the surface of the glass due to uncontrolled slipping or sliding of the sheets over the mold shaping surface when registering therewith. Particularly has this been found to be the case with sheets which are supported above said shaping surface and bent to irregular shapes, inasmuch as there is a certain amount of lateral movement of the sheets relative to said shaping surface in addition to the downwardly settling movement of the sheets in bending into conformity therewith. If, on the other hand, the frictional resistance of the mold shaping surface is great enough to prevent the slipping or sliding, lateral movement of the sheets may result in optical distortions in the glass.

Thus, it has been customary to construct the mold shaping surface in the form of an open ring or outline such that only the marginal areas of the glass sheet come into contact with said shaping surface during the bending operation. In this manner, the portion of the glass sheet within the margins is kept free of mold marks and visibly clear.

It is highly important in the production of window glass to maintain this clear visibility area at a maximum. Thus, mold marks at the margins of the glass sheets must be kept at a minimum and within permissible tolerances. Particularly is this true in the case of severely bent glass sheets used as windshields and/or rear windows for automobiles, wherein great effort and expense is incurred in the production thereof.

It will be understood that the aforementioned uncontrolled lateral movement of the glass sheets is due to the fact that they are bent from a flat to a rather severe and irregular bent shape. It has been found that the greatest amount of this movement occurs at the areas of the sheets which are most severely bent. Thus, in the bending of the sheets to a substantially broad U shape, a relatively large amount of uncontrolled movement has been found to occur at the end areas of the sheets and a relatively small amount at the central areas thereof.

According to this invention there is provided at the portions of a ring type mold, upon which the end marginal areas of the sheet are adapted to rest when bent, a relatively wide shaping surface which is formed in such a manner that it is angularly disposed with respect to said marginal end areas of the sheet when bent into conformity therewith. Thus, only the edge corners of the marginal end areas of the sheet will register with corresponding portions of the mold shaping surface, and upon sliding of the sheet over said shaping surface the surfaces of said sheet will not be marred.

It is also important that the central marginal areas of the glass sheet, which are less severely bent, be subjected to relatively less heat in passing through a furnace. Thus, it is proposed, in accordance with this invention, to form the shaping surface upon which said central marginal areas are adapted to rest in such a manner that it is relatively narrow in cross section and has an upper edge disposed parallel with respect to said central marginal areas of the sheet when bent into conformity therewith. In this manner, adequate support is provided for the central marginal areas of the sheet where a relatively minor amount of uncontrolled movement occurs and, at the same time, less heat is transmitted from the ring of the mold to said areas.

Further to insure that the mold shaping surface presents a smooth and continuous surface for supporting the margins of the bent glass sheet, the transitional areas of the shaping surface between the end areas and center areas thereof are gradually tapered from a relatively wide and angularly disposed portion to a relatively narrow and parallel portion.

It is, therefore, a primary object of this invention to provide an improved apparatus for bending glass sheets whereby mold marks on the margins of the sheet are substantially eliminated.

Another object of this invention is to provide an improved bending mold of the type described which has a continuous and smooth shaping surface for supporting the margins of a glass sheet bent into conformity therewith with a minimum of marring.

Still another object of this invention is to provide an improved mold shaping surface of the type described which will support the margins of the severely bent end areas of a glass sheet only at the edge corners thereof.

Still another object of this invention is to provide an improved mold shaping surface of the type described which will adequately support the margins of the relatively flat central areas of a bent glass sheet and at the same time transmit relatively less heat thereto.

Other objects and advantages of the invention will become more apparent during the course of the following description when taken in connection with the accompanying drawings.

In the drawings, wherein like numerals are employed to designate like parts throughout the same:

Fig. 1 is a plan view of an apparatus for bending glass sheets or plates constructed in accordance with this invention and showing the mold in the closed position;

Fig. 2 is a longitudinal side sectional view of the apparatus of Fig. 1, taken substantially along line 2—2 of Fig. 1;

Fig. 3 is an enlarged fragmentary sectional view similar to Fig. 2 and showing a bent glass sheet on the mold;

Fig. 4 is a view similar to Fig. 3 and showing a flat glass sheet supported above the mold in an open position;

Fig. 5 is an enlarged transverse sectional view of the apparatus of Fig. 1, taken substantially along line 5—5 of Fig. 2;

Fig. 6 is a view similar to Fig. 5 and showing the mold in an open position;

Fig. 7 is a detailed sectional view of a portion of the shaping surface adjacent a locator bar on the mold and showing a bent glass sheet resting thereon;

Fig. 8 is an enlarged sectional view of another portion of the shaping surface taken substantially along line 8—8 of Fig. 3 and showing a bent glass sheet resting thereon; and Fig. 9 is a view similar to Fig. 8 of still another portion of the shaping surface taken substantially along line 9—9 of Fig. 3 and showing a bent glass sheet resting thereon.

Referring now more particularly to the drawings, the bending apparatus of this invention, designated in its entirety by the numeral 10, comprises a rigid framework or rack 11 from which is suspended and supported an outline type mold 12 onto which a glass sheet G is adapted to be bent (Fig. 3). The rack is made up of a pair of end frames 13 and a pair of longitudinal side frames 14 extending between and supported from said end frames. In plan (Fig. 1) the end and side frames together form the generally rectangular outline of the rack 11 within and from the corners of which the mold 12 is supported.

Upstanding leg portions 15 at each end of the end frames 13 include a plurality of slotted openings 16 through which the ends of side frames 14 are adapted to extend. By means of these slots, the effective width of the rack may be changed to accommodate molds of varying widths. That is, the ends of the side frames are made readily removable from and interchangeable with different slots by means of wedge-shaped openings 17 in said ends through which wedges 18 may be inserted to abut against the outer side of end frames 13. Shoulders 19 on the side frames are adapted to abut against the opposite side of the end frames to provide the entire framework with the necessary rigidity.

Extending transversely of the rack at each end thereof and journaled in raised portions 20 of side frames 14 are rods 21. Disposed inwardly of each end of the raised portions and rotatably supported at their upper ends from the rods are links 22 which are spaced apart to support mold 12 by means of rods 23 rigidly secured to and projecting inwardly from the lower opposite ends of the links. As best shown in Figs. 5 and 6, the free ends of rods 23 are journaled in the corner portions of the mold to support the same, when closed, in substantially horizontal alignment with side frames 14.

The mold itself is, as aforementioned, of the outline type. That is to say, the ring-shaped upper surface of the mold upon which the glass sheet G is adapted to rest when bent conforms to the marginal edges of said bent sheet and is the only portion of the mold with which the sheet is adapted to register during the bending operation. As well, the mold may be further described as a multi-section, "hinge" type wherein the sections thereof are connected by hinges to permit swinging of the mold by means of links 22 from an open position for receiving and supporting the glass sheet when flat (Figs. 4 and 6) to a closed position (Figs. 3 and 5) to which the sheet is adapted to conform when bent.

In particular, mold 12 comprises end sections 24, intermediate sections 25, and a center section 26. Hinges 27 serve to connect the end sections 24 to the intermediate sections 25 and the latter to center section 26. As can be seen from Fig. 3, the adjacent end faces of the various sections of the mold are finished in such a manner that when the mold is closed, they are in abutting relation and further closing movement of the mold is positively prevented. Thus, it can be seen that the mold 12 can be swung on links 22 to its open position for supporting a flat glass sheet G (Fig. 4) and will be maintained in that position by the strut-like nature of said flat sheet. However, as the sheet is softened by heating during passage of the mold through a furnace, it will gradually lose its strut-like character and bend to the curvature of the mold (Fig. 3) at which time the mold will move to its closed position.

The outer and inner peripheries of the mold 12 are defined, respectively, by outer rails 28 and inner rails 29 on each of the sections of the mold. The outer and inner rails of each section are rigidly connected by a plurality of cross members 30 and, by means of hinges 27, form continuous rings at the aforementioned outer and inner mold peripheries. Glass sheet G is, of course, adapted to rest upon the inner ring or outline formed by the inner rails 29 of the sections when the mold is closed.

At each end of the mold are sheet locating assemblies 31, rigidly secured to a flanged portion 32 of the inner rail 29 of end sections 24, and comprising a bracket 33 partially surrounding a bar 34 of Marinite or other suitable material which will not fuse with the glass sheet upon heating, and any suitable means 35 for securing the bracket and bar to flange 32, as aforenoted. Thus, with the mold in the open position (Fig. 4), the ends of the flat glass sheet G are properly located above the mold by abutting against the exposed edges of the bars 34 and resting upon the inner rail 29 of end sections 24. Said exposed edges of bars 34 may be finished to conform to the end edges of the sheet G and, if desired, may be serrated vertically at points spaced along the length thereof.

It can further be seen from a comparison of Figs. 3 and 4 that as the glass sheet bends and mold 12 moves from the open to the closed position, bar 34 will follow the abutting edge of the sheet until it settles into conformity with the closed mold at which time the ends of the sheet will be slightly spaced from said bar (Fig. 7). In this manner then, by means of locating assemblies 31, the sheet is held at all times during the actual bending operation in proper relation to the mold.

That portion of the bending apparatus and "hinged" type mold of this invention which has been described above is of the same general type as that shown in Patent No. 2,551,607, wherein the construction and operation thereof are described in greater detail. It is to be understood, however, that the particular novel construction of the shaping surface of the mold 12 to be hereinafter described is not to be limited to use with this particular "hinged" type of mold. In fact, it is contemplated that the novel mold shaping surface of this invention may be used with any of a variety of bending apparatus in which a glass sheet is supported above and bent into conformity with the mold.

As previously mentioned, it is upon a ring formed by the inner rails 29 of the sections of the mold when closed that the margins of the glass sheet are adapted to rest when bent. The upper edge surface of this ring, which conforms to the desired curvature of the bent sheet, comprises the shaping surface of the mold and is designated in its entirety by the numeral 36.

At the end areas of the mold 12, where the greatest amount of shifting of the glass sheet has been found to occur during the bending operation, the shaping surface 35 is so formed as to be angularly disposed with respect to the adjacent margins of the sheet when bent. Referring to Fig. 4, it can be seen that only an edge corner of the sheet G when flat contacts the shaping surface at the end of the mold. As well, it can be seen from Fig. 7 that at the completion of the bend a similar edge corner contacting relation exists. Thus, during the entire bending operation, only the edge corners of the end areas of the glass sheet are in registry with the corresponding end areas of the mold shaping surface. In this manner, mold marks resulting from slippage of the glass over the shaping surface are eliminated.

It will be readily understood that mold marks would occur at the marginal portions of the end areas of the glass if the shaping surface were so narrow that the undersurface of said portions were permitted to slide thereover during the shifting of the sheet. That is, in such a case, instead of the corner edge of the glass sheet contacting the flat shaping surface, the corner edge of the shaping surface would contact the flat surface of the sheet. Thus, at these end areas where the greatest amount of shifting has been found to occur, the shaping surface 36 is made relatively wide. Particularly is this true at the outermost end areas of the shaping surface adjacent the locating assemblies 31 where, at the completion of the bending operation, the end edges of the sheet move downwardly from bar 34 (Fig. 7). In this respect, flanges 32 at both ends of the inner rail 29 serve to provide these areas of the shaping surface with even greater width.

Small ledges 37 (Fig. 8) may be provided on the inner rail 29 of the end sections 24 at both sides and adjacent flange 32. Due to the proportionately smaller amount of shifting of the glass sheet between the end areas and the central area thereof, it has been found best to gradually reduce the width of the ledges from a point on inner rail 29 adjacent flange 32 to a point adjacent the end faces of the inner rail of the end section 24. Thus, the width of the ledge may be tapered from a maximum adjacent the flange 32 to a vanishing point adjacent said end faces where the width of the shaping surface is determined by the width of the upper edge of inner rail 29 of the end section. If desired, however, intermediate sections 25 may also be provided with ledges in which case the taper would extend from a point adjacent flange 32 to a vanishing point adjacent the innermost end faces of said intermediate sections.

As best shown in Figs. 3 and 4, the angular disposition of shaping surface 36 with respect to the adjacent margins of the bent glass sheet is also gradually tapered from a maximum adjacent flange 32 to a vanishing point adjacent the innermost end faces of intermediate sections 25 where the shaping surface is disposed parallel to said sheet. This feature is further illustrated by a comparison of Figs. 7 and 8 wherein the angular disposition of the shaping surface 36 at a point inwardly of the outermost end of the shaping surface is considerably less than at the latter outermost location.

Thus, the entire length of the shaping surface 36 of the center section 26 of the mold is so constructed as to be parallel to the marginal areas of the bent glass sheet supported thereon (Fig. 9). As mentioned previously, it is at this central area of the mold, where the bend of the sheet is less severe, that only minor shifting of the sheet has been found to occur and only negligible mold marks have been found to result therefrom.

As well, to lessen the heat transmission from the mold to the sheet in these central areas, it is proposed to narrow the shaping surfaces by providing at the upper edge of inner rail 29 of the center section an indented portion 38 extending the entire length thereof. At the ends of said inner rails, the indented portions may be flared outwardly as at 39 to provide a continuously tapered width of shaping surface at the adjacent shaping surfaces of the center section 26 and intermediate sections 25.

Thus, from the foregoing description it can be seen that there is formed on the upper edge of the continuously tapered inner ring 29 of the closed mold 12, a shaping surface 36 into conformity with which a glass sheet G is adapted to be bent with a minimum of marring on the surface thereof. It is to be understood that the form of the invention disclosed herein is to be taken as the preferred embodiment thereof, and that various changes in the shape, size and arrangement of parts may be resorted to without departing from the spirit of the invention or the scope of the following claims.

I claim:

1. In combination with apparatus for bending glass sheets, a mold having a shaping surface conforming to the curvature and in outline to the marginal edges of a bent glass sheet, the end areas of the shaping surface being angularly disposed with respect to adjacent margins of the bent glass sheet for supporting only the corner edges thereof and the central areas of the shaping surface being parallel to adjacent margins.

2. In combination with apparatus for bending glass sheets, a mold having a shaping surface conforming to the curvature and in outline to the marginal edges of a bent glass sheet, the end areas of the shaping surface being relatively wide and angularly disposed with respect to adjacent margins of the bent glass sheet for supporting only the corner edges thereof and the central areas of the shaping surface being relatively narrow.

3. In combination with apparatus for bending glass sheets, a mold having a shaping surface conforming to the curvature and in outline to the marginal edges of a bent glass sheet, the end areas of the shaping surface being angularly disposed with respect to adjacent margins of the bent glass sheet for supporting only the corner edges thereof and the central areas of the shaping surface being relatively narrow and parallel to adjacent margins.

4. In combination with apparatus for bending glass sheets, a mold having a shaping surface conforming to the curvature and in outline to the marginal edges of a bent glass sheet, the end areas of the shaping surface being angularly disposed with respect to adjacent margins of the bent glass sheet for supporting only the corner edges thereof, the central areas of the shaping surface being parallel to adjacent margins, and the transitional areas of the shaping surface between the end areas and the central areas thereof being gradually tapered from their angularly disposed position adjacent said end areas to their parallel position adjacent said central areas.

5. A mold of the character defined in claim 4, in which the end areas of the shaping surface are relatively wide and the central areas relatively narrow.

6. A mold of the character defined in claim 5, in which the transitional areas of the shaping surface are of gradually decreasing width from the relatively wide end areas to the relatively narrow central areas.

7. In combination with apparatus for bending glass sheets, a mold having a shaping surface conforming to the curvature and in outline to the marginal edges of a bent glass sheet, the end areas of the shaping surface being relatively wide and angularly disposed with respect to adjacent margins of the bent glass sheet for supporting only the corner edges thereof, the central areas of the shaping surface being relatively narrow, and the transitional areas of the shaping surface between the end areas and the central areas thereof being of gradually decreasing width from the relatively wide end areas to the relatively narrow central areas.

8. In combination with apparatus for bending glass sheets, a mold having a rail conforming in outline and adapted to support the margins of a bent glass sheet, the longitudinal cross section of the rail conforming to the curvature of the bent glass sheet and including end areas of relatively severe curvature and central areas of relatively less curvature, and a shaping surface on the sheet supporting edge of the rail including portions toward said end areas angularly disposed with respect to the margins of the bent glass sheet supported thereon and portions toward said central areas parallel to the margins of the bent glass sheet supported thereon.

9. A mold of the character described in claim 8, in which the portions of the shaping surface toward said end areas of the rail are relatively wide and the portions toward the central areas are relatively narrow.

10. A mold of the character defined in claim 9, in which the angularly disposed end portions of the shaping surface are gradually tapered to a vanishing point adjacent the central portions of the shaping surface parallel to the margins of the bent glass sheet supported thereon.

11. In combination with apparatus for bending glass sheets, a mold having a rail conforming in cross section to the curvature and in outline to the marginal edges of a bent glass sheet and a shaping surface on the upper edge of the rail for supporting the margins of said bent glass sheet, and comprising end areas angularly disposed with respect to the marginal portion of a bent glass sheet supported thereon, central areas parallel to the marginal portion of the bent glass sheet supported thereon, and transitional areas between said end areas and central areas in which the angular disposition thereof with respect to the marginal portion of the glass sheet supported thereon is gradually tapered from a maximum at a point adjacent said end areas to a vanishing point adjacent said central areas.

12. In combination with apparatus for bending glass sheets, a mold having a rail conforming in cross section to the curvature and in outline to the marginal edges of a bent glass sheet, an upper edge surface on the rail for supporting the margins of said bent glass sheet and having end areas and a central area, and a ledge extending outwardly from and as a continuation of the end areas of said upper edge surface and gradually decreasing in width to a vanishing point adjacent the central area of said surface.

13. A mold of the character defined in claim 12, in which the central areas of the upper edge surface are reduced in width.

References Cited in the file of this patent

UNITED STATES PATENTS

| Number | Name | Date |
|---|---|---|
| 2,633,673 | Bamford et al. | Apr. 7, 1953 |

FOREIGN PATENTS

| Number | Country | Date |
|---|---|---|
| 681,943 | Great Britain | Oct. 29, 1952 |